US009949179B2

(12) United States Patent
Zhao et al.

(10) Patent No.: US 9,949,179 B2
(45) Date of Patent: Apr. 17, 2018

(54) METHOD AND DEVICE FOR INDICATING D2D RELATED INFORMATION AND DETERMINING D2D TRANSMISSION RESOURCE

(71) Applicant: China Academy of Telecommunications Technology, Beijing (CN)

(72) Inventors: Yali Zhao, Beijing (CN); Erlin Zeng, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 15/124,823

(22) PCT Filed: Mar. 17, 2015

(86) PCT No.: PCT/CN2015/074381
§ 371 (c)(1),
(2) Date: Sep. 9, 2016

(87) PCT Pub. No.: WO2015/139609
PCT Pub. Date: Sep. 24, 2015

(65) Prior Publication Data
US 2017/0019822 A1    Jan. 19, 2017

(30) Foreign Application Priority Data
Mar. 17, 2014 (CN) .......................... 2014 1 0099487

(51) Int. Cl.
*H04W 4/00* (2009.01)
*H04W 36/00* (2009.01)
(Continued)

(52) U.S. Cl.
CPC ....... *H04W 36/0072* (2013.01); *H04W 8/005* (2013.01); *H04W 36/08* (2013.01);
(Continued)

(58) Field of Classification Search
CPC ............ H04W 36/00; H04W 36/0005; H04W 36/0055; H04W 36/0072; H04W 72/0406
See application file for complete search history.

(56) References Cited

U.S. PATENT DOCUMENTS

2004/0176094 A1* 9/2004 Kim .................. H04W 36/0083
455/438
2013/0102314 A1* 4/2013 Koskela ............ H04W 36/0072
455/436
(Continued)

FOREIGN PATENT DOCUMENTS

CN    102469543 A     5/2012
CN    102783211       11/2012
(Continued)

OTHER PUBLICATIONS

International Search Report for PCT/CN2015/074381 dated May 27, 2015.
(Continued)

*Primary Examiner* — Kevin C Harper
(74) *Attorney, Agent, or Firm* — Foley & Lardner LLP

(57) ABSTRACT

A method and device for indicating D2D related information and determining D2D transmission resources, the method comprising: transmitting to a target base station a switching request message after determining cell switching for a device to device user equipment (D2D UE), the switching request message comprising D2D related information of the D2D UE; receiving a switching command transmitted by the target base station, the switching command comprising the resource allocation type and/or D2D transmission resource for the D2D UE in a target cell determined by the target base (Continued)

station based on the D2D related information; and transmitting the determined resource allocation type and/or D2D transmission resource to the D2D UE. The present invention solves the existing problem of how to determine D2D transmission resources during cell switching for a UE in D2N connection state.

20 Claims, 7 Drawing Sheets

(51) Int. Cl.
    *H04W 72/04* (2009.01)
    *H04W 8/00* (2009.01)
    *H04W 36/08* (2009.01)
    *H04W 76/04* (2009.01)
    *H04W 88/02* (2009.01)
    *H04W 88/08* (2009.01)

(52) U.S. Cl.
    CPC ....... *H04W 72/048* (2013.01); *H04W 76/046* (2013.01); *H04W 88/02* (2013.01); *H04W 88/08* (2013.01)

(56) References Cited

U.S. PATENT DOCUMENTS

2013/0324114 A1   12/2013   Raghothaman et al.
2014/0235234 A1*   8/2014   Jang ..................... H04W 36/18
                                                                  455/426.1
2015/0215767 A1*   7/2015   Siomina .................. H04W 8/02
                                                                   455/435.2
2015/0215982 A1*   7/2015   Siomina .............. H04W 76/023
                                                                     370/252
2015/0282033 A1*   10/2015   Lunden ............. H04W 36/0055
                                                                       455/436

FOREIGN PATENT DOCUMENTS

| CN | 103200634 | 7/2013 |
|---|---|---|
| CN | 103379654 A | 10/2013 |
| CN | 103493529 | 1/2014 |
| CN | 103582127 A | 2/2014 |
| JP | 2015-508598 A1 | 3/2015 |
| WO | WO-2013/042979 A2 | 3/2013 |
| WO | WO-2013/100831 A1 | 7/2013 |
| WO | WO-2014/014323 A1 | 1/2014 |
| WO | WO-2014/014326 A1 | 1/2014 |

OTHER PUBLICATIONS

R2-134372; LG Electronics, "D2D radio resource usage upon mobility", 3GPP TSG-RAN WG2 #84, Nov. 11-15, 2013. (3 pages).

* cited by examiner

METHOD AND DEVICE FOR INDICATING D2D RELATED INFORMATION AND DETERMINING D2D TRANSMISSION RESOURCE

This application is a US National Stage of International Application No. PCT/CN2015/074381, filed on Mar. 17, 2015, designating the United States and claiming the priority to Chinese Patent Application No. 201410099487.3, filed with the Chinese Patent Office on Mar. 17, 2014 and entitled "Method and apparatus for indicating D2D related information and determining a D2D transmission resource", the content of which is hereby incorporated by reference in its entirety.

FIELD

The present invention relates to the field of wireless communications, and particularly to a method and apparatus for indicating D2D related information and determining a D2D transmission resource.

BACKGROUND

1) Long Term Evolution Device to Network (LTE D2N) Communication System

As illustrated in FIG. 1, in the LTE system, D2N communication is controlled centrally by the network, that is, both uplink and downlink data of a User Equipment (UE) (also referred to a terminal) are transmitted and received under the control of the network. Communication between one UE and another UE is forwarded and controlled by the network, and there is no direct communication link between the UE and the other UE, where data transmission between the UE and the network in this mode can be referred simply to as D2N transmission.

2) Device to Device (D2D) Proximity Services

As illustrated in FIG. 2, the D2D proximity services are generally categorized as follows in the 3$^{rd}$ Generation Partnership Project (3GPP):

D2D proximity service discovery (D2D Discovery): A UE determines another UE proximate thereto over an Evolved Universal Terrestrial Radio Access Network (E-UTRAN). For example, the D2D UE can search for a taxi proximate thereto, a friend proximate thereto, etc., using this service.

D2D proximity service communication (D2D Communication): A link is set up directly between two UEs proximate to each other, so that a communication link originally for transmission over the network is translated into a local direct communication link to thereby significantly save a bandwidth and improve the efficiency of the network; or two UEs proximate to each other can be provided with a high-speed and cheap communication service by communicating over a direct link. Proximity service communication is generally conducted under the control or assistance of the network side, where an evolved Node B (eNB) (also referred to a base station) even allocate dynamically a resource for a UE in proximity service communication.

For the sake of a convenient description, two types of links can be defined as follows:

A D2D link refers to a link for direct communication between one device and another device; and A D2N link refers to a link for communication between a device and a network node.

Moreover the UEs participating D2D Discovery and/or Communication play two roles as follows:

A D2D transmitting UE refers to a UE transmitting a D2D Discovery and/or Communication message; and A D2D receiving UE refers to a UE receiving the D2D Discovery and/or Communication message transmitted by the D2D transmitting UE.

3) Allocation Types of D2D Discovery Resources

There are two allocation types of D2D Discovery resources currently defined in the 3GPP as follows:

Type1 where the UE selects one of resources in a pool of transmission resources to transmit a D2D Discovery message, i.e., a UE selection mode; and Type2 where the UE transmits a D2D Discovery message over a resource allocated by the network, i.e., a network scheduling mode. Type2 can be further categorized into two allocation types of resources, i.e., Type2A and Type2B, dependent upon whether the D2D Discovery message transmission resource allocated by the network is dynamic or semi-static. For Type2A, the network may allocate dynamically a resource for the D2D Discovery transmitting UE to transmit a D2D Discovery message; and for Type2B, the network may allocate semi-statically a resource for the D2D Discovery transmitting UE to transmit a D2D Discovery message.

4) Allocation Types of D2D Communication Resources

There are also two allocation types of D2D Communication resources currently defined in the 3GPP as follows:

Mode1 where the network schedules a D2D transmission resource for the D2D Communication transmitting UE, i.e., a network scheduling mode; and Mode2 where the UE selects one of resources in a pool of D2D Communication transmission resources to transmit a D2D Communication message, i.e., a UE selection mode.

If the allocation type of the D2D Discovery and/or Communication resource selected by the D2D transmitting UE is controlled by the network, then the D2D transmitting UE in the D2N connected state may determine a D2D transmission resource to be used in a destination cell when a cell handover occurs.

SUMMARY

Embodiments of the invention provide a method and apparatus for indicating D2D related information and determining a D2D transmission resource, by proposing a solution to determining, by a D2D UE performing a cell handover, a D2D transmission resource to be used in a destination cell.

An embodiment of the invention provides a method for indicating by a source base station D2D related information, the method including:

transmitting a handover request message including Device to Device (D2D) related information of a D2D UE to a destination base station upon deciding to perform a cell handover of the D2D UE;

receiving a handover command transmitted by the destination base station, wherein the handover command includes a resource allocation type and/or a D2D transmission resource of the D2D UE in a destination cell, determined by the destination base station according to the D2D related information; and transmitting the determined resource allocation type and/or D2D transmission resource to the D2D UE.

An embodiment of the invention further provides a method for indicating by a destination base station D2D transmission resource, the method including:

receiving a handover request message, including D2D related information of a D2D UE, transmitted by a source base station;

determining a resource allocation type of the D2D UE in a destination cell according to the D2D related information, and/or determining a D2D transmission resource of the D2D UE according to the determined resource allocation type, upon determining that the D2D UE is a D2D transmitting UE; and transmitting a handover command carrying the determined resource allocation type and/or D2D transmission resource to the source base station.

An embodiment of the invention further provides a method for determining by a D2D UE a D2D transmission resource, the method including:

receiving a resource allocation type and/or a D2D transmission resource of the D2D UE in a destination cell transmitted by a source base station when a cell handover is being performed; and releasing a D2D transmission resource in a source cell, and determining a D2D transmission resource to be used in the destination cell, according to the resource allocation type and/or the D2D transmission resource in the destination cell.

An embodiment of the invention further provides a source base station for indicating a D2D transmission resource, the source base station including:

a handover requesting unit configured to transmit a handover request message including Device to Device (D2D) related information of a D2D UE to a destination base station upon deciding to perform a cell handover of the D2D UE, a handover command receiving unit configured to receive a handover command transmitted by the destination base station, wherein the handover command includes a resource allocation type and/or a D2D transmission resource of the D2D UE in a destination cell, determined by the destination base station according to the D2D related information; and a resource transmitting unit configured to transmit the determined resource allocation type and/or D2D transmission resource to the D2D UE, An embodiment of the invention further provides a destination base station for indicating a D2D transmission resource, the source base station including:

a request receiving unit configured to receive a handover request message, including D2D related information of a D2D UE, transmitted by a source base station;

a resource determining unit configured to determine a resource allocation type of the D2D UE in a destination cell according to the D2D related information, and/or to determine a D2D transmission resource of the D2D UE according to the determined resource allocation type, upon determining that the D2D UE is a D2D transmitting UE; and a resource indicating unit configured to transmit a handover command carrying the determined resource allocation type and/or D2D transmission resource to the source base station.

An embodiment of the invention further provides a D2D UE including:

an indication receiving unit configured to receive a resource allocation type and/or a D2D transmission resource of the D2D UE in a destination cell transmitted by a source base station when a cell handover is being performed; and a resource determining unit configured to release a D2D transmission resource in a source cell, and to determine a D2D transmission resource to be used in the destination cell, according to the resource allocation type and/or the D2D transmission resource in the destination cell.

A particular advantageous effect of the methods and apparatuses for indicating D2D related information and determining a D2D transmission resource according to the embodiments of the invention lies in the solution to selecting a D2D transmission resource by the D2D transmitting UE performing the cell handover so as to address how to determine the D2D transmission resource by the existing UE, in the D2N connected state, when the handover occurs.

DETAILED DESCRIPTION OF THE EMBODIMENTS

A method and apparatus for indicating D2D related information and determining a D2D transmission resource according to the invention will be described below in further details with reference to the drawings and the embodiments thereof.

In future development of a mobile communication system, in order to better satisfy a demand of its subscriber, and to improve the efficiency of exchanging information between devices, the mechanisms of Device to Device Discovery (D2D Discovery) and Device to Device Communication (D2D Communication) have been introduced. There are a D2D transmitting UE and a D2D receiving UE for both D2D Discovery and D2D Communication. The D2D transmitting UE needs to firstly determine a resource available to D2D transmission, before conducting D2D transmission.

In view of this, the invention proposes a method for indicating D2D related information, and a method determining a D2D transmission resource, when a cell handover is being performed.

Figure 1:
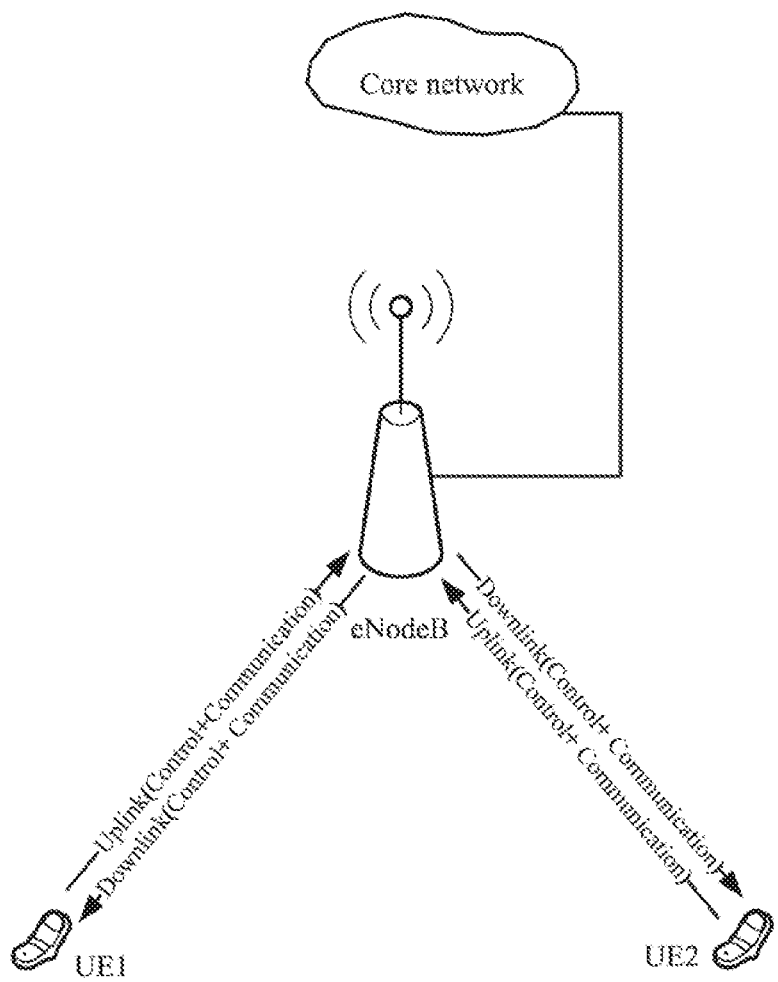
FIG. 1 is a schematic diagram of the mode of communication controlled centrally by the network in the LTE system.
Figure 2:
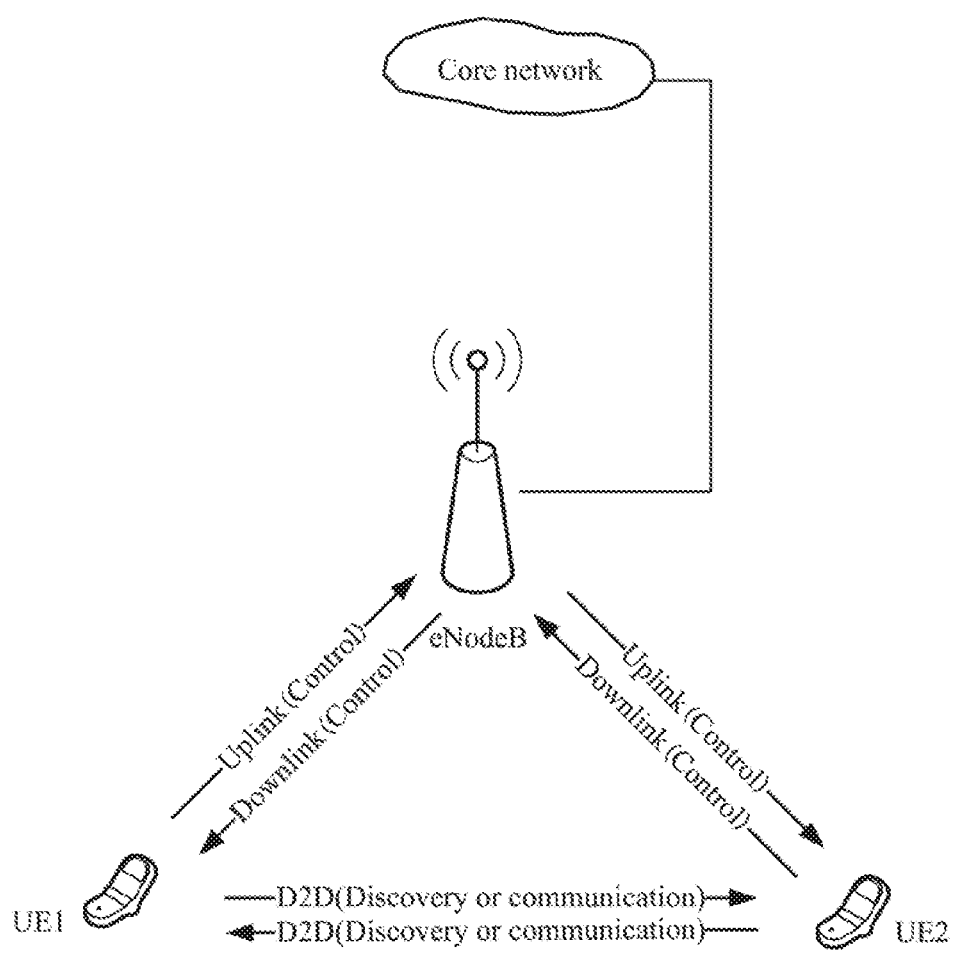
FIG. 2 is a schematic diagram of D2D discovery and/or communication by the D2D UE.
Figure 3:
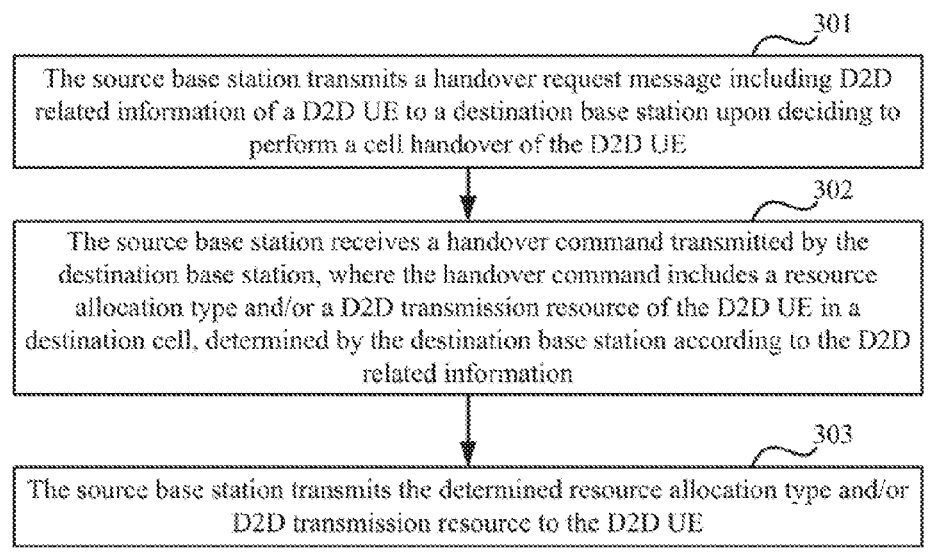
FIG. 3 is a flow chart of a method for indicating by a source base station a D2D transmission resource according to an embodiment of the invention.

As illustrated in FIG. 3, a method for indicating by a source base station Device to Device (D2D) related information at the source base station side includes:

In the operation 301, the source base station transmits a handover request message including D2D related information of a D2D UE to a destination base station upon deciding to perform a cell handover of the D2D UE;

The source base station can make a D2N handover decision on the D2D UE as in the prior art, so a detailed description thereof will be omitted here; and the source base station may further determine a destination cell, and thus the destination base station, upon deciding to perform the cell handover;

In the operation 302, the source base station receives a handover command transmitted by the destination base station, where if the destination base station supports a D2D function, then the handover command may include a resource allocation type and/or a D2D transmission resource of the D2D UE in a destination cell, determined by the destination base station according to the D2D related information;

In the operation 303, the source base station transmits the determined resource allocation type and/or D2D transmission resource to the D2D UE.

Preferably the source base station carries the handover command in Radio Resource Control (RRC) reconfiguration signaling in the form of a container, and transmits the container to the D2D UE for which the cell handover is to be performed, upon reception of the handover command to thereby transmit the determined resource allocation type and/or D2D transmission resource to the D2D UE.

The D2D related information above is information required for the destination base station to determine the resource allocation type of the D2D UE in the destination cell upon determining that the D2D UE is a D2D transmitting UE.

The source base station transmitting the handover request carrying the D2D related information to the destination base station can further carry D2D UE capability in the handover request message.

The D2D UE capability includes indication information of a resource allocation type of D2D discovery and/or communication supported by the D2D UE.

The D2D related information can include D2D discovery related information and/or D2D communication related information.

The D2D discovery related information of the D2D UE can particularly include any one of
1) Communication type indication information;
2) Resource allocation type indication information;
3) Communication type indication information and resource allocation type indication information;
4) Transmission type indication information and resource allocation type indication information;
5) Communication type indication information, transmission type indication information, resource allocation type indication information, and resource configuration information; and
6) D2D discovery request information.

Here the communication type indication information indicates whether the D2D UE is performing D2D discovery; the resource allocation type indication information is Type1 (a UE selection mode), Type2a (a network scheduling mode), or Type2b (a network scheduling mode), or the resource allocation type indication information is Type1 (a UE selection mode) or Type2b (a network scheduling mode); and the transmission type indication information indicates whether the D2D UE is a D2D transmitting UE or a D2D receiving UE.

The D2D communication related information can particularly include any one of
1) Communication type indication information;
2) Resource allocation type indication information;
3) Communication type indication information and resource allocation type indication information;
4) Transmission type indication information and resource allocation type indication information;
5) Communication type indication information, transmission type indication information, resource allocation type indication information, and resource configuration information; and
6) D2D communication request information.

Here the communication type indication information indicates whether the D2D UE is performing D2D communication; the resource allocation type indication information is Mode1 (a network scheduling mode) or Mode2 (a UE selection mode); and the transmission type indication information indicates whether the D2D UE is a D2D transmitting UE or a D2D receiving UE.

The D2D related information which is the respective categories of information above can be indicated preferably as described below respectively but without any limitation thereto, and the D2D related information can alternatively be otherwise indicated so that the destination base station can determine whether the D2D UE is a transmitting D2D UE, and the resource allocation type thereof.

If the D2D related information is D2D communication related information, then the D2D related information may be indicated particularly as follows:

1) The D2D communication related information is communication type indication information.

In order to enable the destination base station to determine whether the D2D UE is a D2D transmitting UE, and to further determine the resource allocation type of the D2D UE in the destination cell after determining that the D2D UE is a D2D transmitting UE, the following indication approach can be applied:

The source base station carries the D2D communication related information in the handover request message transmitted to the destination base station only if the D2D UE is a D2D transmitting UE, and a communication type thereof is D2D communication; and The source base station does not carry the D2D communication related information in the handover request message for a D2D communication receiving UE.

2) The D2D communication related information is resource allocation type indication information.

In order to enable the destination base station to determine whether the D2D UE is a D2D transmitting UE, and to further determine the resource allocation type of the D2D UE in the destination cell after determining that the D2D UE is a D2D transmitting UE, the following indication approach can be applied:

The source base station carries the D2D communication related information in the handover request message transmitted to the destination base station only if the D2D UE is a D2D transmitting UE, and a resource allocation type thereof is Mode1 (a network scheduling mode) or Mode2 (a UE selection mode); and The source base station does not carry the D2D communication related information in the handover request message for a D2D communication receiving UE.

3) The D2D communication related information is communication type indication information and resource allocation type indication information.

In order to enable the destination base station to determine whether the D2D UE is a D2D transmitting UE, and to further determine the resource allocation type of the D2D UE in the destination cell after determining that the D2D UE is a D2D transmitting UE, the following indication approach can be applied:

The source base station carries the D2D communication related information in the handover request message transmitted to the destination base station only if the D2D UE is a D2D transmitting UE, and a communication type thereof is D2D communication or a resource allocation type is Mode1 (a network scheduling mode) or Mode2 (a UE selection mode); and The source base station does not carry the D2D communication related information in the handover request message for a D2D communication receiving UE, 4) The D2D communication related information is transmission type indication information and resource allocation type indication information.

Since the transmission type indication information can indicate whether the D2D UE is a D2D receiving UE, the source base station carries the D2D communication related information in the handover request message transmitted to the destination base station no matter whether the D2D UE is a D2D receiving UE or D2D transmitting UE for D2D communication.

5) The D2D communication related information is communication type indication information, transmission type indication information, resource allocation type indication information, and resource configuration information, Since the transmission type indication information can indicate whether the D2D UE is a D2D receiving UE, the source base station carries the D2D communication related information in the handover request message transmitted to the destination base station no matter whether the D2D UE is a D2D receiving UE or D2D transmitting UE for D2D communication.

If the D2D related information is D2D discovery related information, then the D2D related information may be indicated particularly as follows:

1) The D2D discovery related information is communication type indication information.

In order to enable the destination base station to determine whether the D2D UE is a D2D transmitting UE, and to further determine the resource allocation type of the D2D UE in the destination cell after determining that the D2D UE is a D2D transmitting UE, the following indication approach can be applied:

The source base station carries the D2D discovery related information in the handover request message transmitted to the destination base station only if the D2D UE is a D2D transmitting UE, and a communication type thereof is D2D discovery; and The source base station does not carry the D2D discovery related information in the handover request message for a D2D discovery receiving UE.

2) The D2D discovery related information is resource allocation type indication information.

In order to enable the destination base station to determine whether the D2D UE is a D2D transmitting UE, and to further determine the resource allocation type of the D2D UE in the destination cell after determining that the D2D UE is a D2D transmitting UE, the following indication approach can be applied:

The source base station carries the D2D discovery related information in the handover request message transmitted to the destination base station only if the D2D UE is a D2D transmitting UE, and a resource allocation type thereof is Type1 (a UE selection mode) or type2a (a network scheduling mode) or type2b (a network scheduling mode); and The source base station does not carry the D2D discovery related information in the handover request message for a D2D discovery receiving UE, 3) The D2D discovery related information is communication type indication information and resource allocation type indication information.

In order to enable the destination base station to determine whether the D2D UE is a. D2D transmitting UE, and to further determine the resource allocation type of the D2D UE in the destination cell after determining that the D2D UE is a D2D transmitting UE, the following indication approach can be applied:

The source base station carries the D2D discovery related information in the handover request message transmitted to the destination base station only if the D2D UE is a D2D transmitting UE, and a communication type thereof is D2D discovery or a resource allocation type is Type1 (a UE selection mode) or type2a (a network scheduling mode) or type2b (a network scheduling mode); and The source base station does not carry the D2D discovery related information in the handover request message for a D2D discovery receiving UE.

4) The D2D discovery related information is transmission type indication information and resource allocation type indication information.

Since the transmission type indication information can indicate whether the D2D UE is a D2D receiving UE, the source base station carries the D2D discovery related information in the handover request message transmitted to the destination base station no matter whether the D2D UE is a D2D receiving UE or D2D transmitting UE for D2D discovery.

5) The D2D discovery related information is communication type indication information, transmission type indication information, resource allocation type indication information, and resource configuration information.

Figure 4:
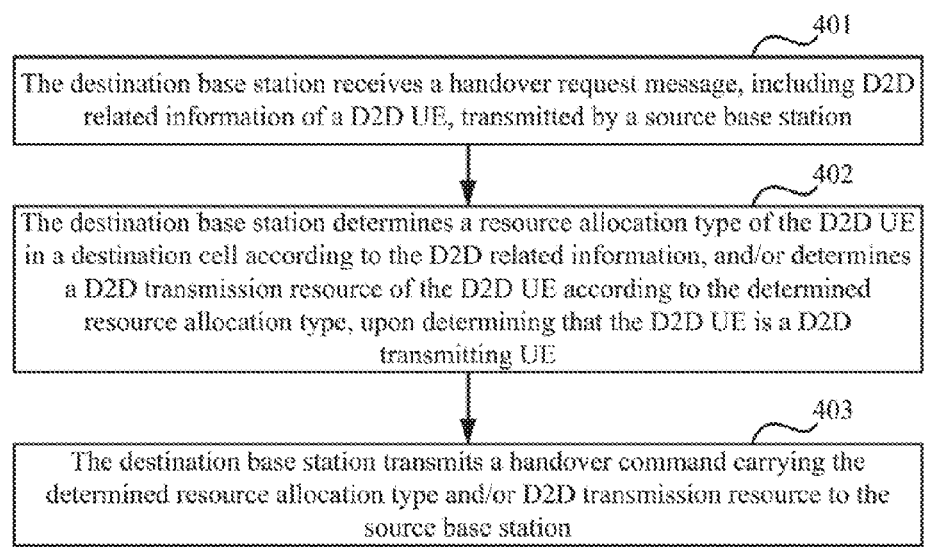
FIG. 4 is a flow Chart of a method for indicating by a destination base station a D2D transmission resource according to an embodiment of the invention.

Since the transmission type indication information can indicate whether the D2D UE is a D2D receiving UE, the source base station carries the D2D discovery related information in the handover request message transmitted to the destination base station no matter whether the D2D UE is a D2D receiving UE or D2D transmitting UE for D2D discovery, As illustrated in FIG. 4, a method for indicating by a destination base station a Device to Device (D2D) transmission resource at the destination base station side includes:

In the operation 401, the destination base station receives a handover request message, including D2D related information of a D2D UE, transmitted by a source base station;

In the operation 402, the destination base station determines whether a D2D function is supported, if so, then the destination base station may determine a resource allocation type of the D2D UE in a destination cell according to the D2D related information, and/or determine a. D2D transmission resource of the D2D UE according to the determined resource allocation type, upon determining that the D2D UE is a D2D transmitting UE;

If the destination base station determines that the D2D UE is a D2D transmitting UE, then in order to determine the resource allocation type of the D2D UE in the destination cell, the destination base station may determine a D2D communication type of the D2D UE according to the D2D related information, and thus select one of allocation types of resources corresponding to the D2D communication type as the resource allocation type of the D2D UE in the destination cell.

Preferably if the resource allocation type is Type2 (Type2A/B, i.e., Type2A or Type2B)/Mode1 (a network scheduling mode), then the destination base station may further determine a particular D2D transmission resource over which the D2D UE transmits a D2D discovery message and/or a D2D communication message in the destination cell.

In the operation 403, the destination base station transmits a handover command carrying the determined resource allocation type and/or D2D transmission resource to the source base station.

The handover request message carrying the D2D related information received by the destination base station further carries D2D UE capability.

The D2D UE capability includes indication information of a resource allocation type of D2D and/or communication supported by the D2D UE.

Preferably the D2D related information includes D2D discovery related information and/or D2D communication related information.

The D2D discovery related information of the D2D UE particularly includes any one of:

1) Communication type indication information;
2) Resource allocation type indication information;
3) Communication type indication information and resource allocation type indication information;
4) Transmission type indication information and resource allocation type indication information;
5) Communication type indication information, transmission type indication information, resource allocation type indication information, and resource configuration information; and
6) D2D discovery request information.

Here the communication type indication information indicates whether the D2D UE is performing D2D discovery; the resource allocation type indication information is Type1 (a UE selection mode), Type2a (a network scheduling mode), or Type2b (a network scheduling mode), or the resource allocation type indication information is Type1 or Type2b; and the transmission type indication information indicates whether the D2D UE is a D2D transmitting UE or a D2D receiving UE.

The D2D communication related information can particularly include any one of:

1) Communication type indication information;
2) Resource allocation type indication information;
3) Communication type indication information and resource allocation type indication information;
4) Transmission type indication information and resource allocation type indication information;
5) Communication type indication information, transmission type indication information, resource allocation type indication information, and resource configuration information; and
6) D2D communication request information.

Here the communication type indication information indicates whether the D2D UE is performing D2D communication; the resource allocation type indication information is Mode1 (a network scheduling mode) or Mode2 (a UE selection mode); and the transmission type indication information indicates whether the D2D UE is a D2D transmitting UE or a D2D receiving UE.

In an embodiment of the invention, the destination base station can determine for the D2D discovery UE whether the D2D UE is a D2D transmitting UE in one of the following approaches:

If the D2D discovery related information is communication type indication information and/or resource allocation type indication information, then the destination base station may determine that the D2D UE is a D2D transmitting UE.

If the D2D discovery related information is transmission type indication information and resource allocation type indication information, or is communication type indication information, transmission type indication information, and resource allocation type indication information, then the destination base station may determine whether the D2D UE is a D2D transmitting UE according to the transmission type indication information In an embodiment of the invention, the destination base station can determine for the D2D communication UE whether the D2D UE is a D2D transmitting UE in one of the following approaches:

If the D2D communication related information is communication type indication information and/or resource allocation type indication information, then the destination base station may determine that the D2D UE is a D2D transmitting UE.

If the D2D communication related information is transmission type indication information and resource allocation type indication information, or is communication type indication information, transmission type indication information, and resource allocation type indication information, then the destination base station may determine whether the D2D UE is a D2D transmitting UE according to the transmission type indication information.

In an embodiment of the invention, the destination base station can determine the resource allocation type of the D2D UE in the destination cell in one of the following approaches upon determining that the D2D UE is a D2D transmitting UE:

1) The D2D discovery related information is communication type indication information.

The destination base station determines the resource allocation type of the D2D UE in the destination cell according to the communication type indication information, and the indication information of the allocation type of D2D discovery resource supported by the D2D UE in the UE capability information in the handover request message.

2) The D2D discovery related information is resource allocation type indication information.

The destination base station determines the resource allocation type of the D2D UE in the destination cell according to the resource allocation type indication information, and/or the indication information of the allocation type of D2D discovery resource supported by the D2D UE in the UE capability information in the handover request message.

3) The D2D discovery related information is communication type indication information and resource allocation type indication information.

The destination base station particularly determines the resource allocation type of the D2D UE in the destination cell according to the following information:

The communication type indication information; or

The resource allocation type indication information; or

The communication type indication information and the resource allocation type indication information; or The indication information of the allocation type of D2D discovery resource supported by the D2D UE in the UE capability information in the handover request message; or The communication type indication information, and the indication information of the allocation type of D2D discovery resource supported by the D2D UE in the UE capability information in the handover request message; or The resource allocation type indication information, and the indication information of the allocation type of D2D discovery resource supported by the D2D UE in the UE capability information in the handover request message; or The communication type indication information, the resource allocation type indication information, and the indication information of the allocation type of D2D discovery resource supported by the D2D UE in the UE capability information in the handover request message.

4) The D2D discovery related information is transmission type indication information and resource allocation type indication information.

The destination base station particularly determines the resource allocation type of the D2D UE in the destination cell according to the following information:

The resource allocation type indication information; or

The indication information of the allocation type of D2D discovery resource supported by the D2D UE in the UE capability information in the handover request message; or The resource allocation type indication information, and the indication information of the allocation type of D2D discovery resource supported by the D2D UE in the UE capability information in the handover request message.

5) The D2D discovery related information is communication type indication information, transmission type indication information, resource allocation type indication information, and resource configuration information.

The destination base station particularly determines the resource allocation type of the D2D UE in the destination cell according to the following information:

The communication type indication information; or

The resource allocation type indication information; or

The communication type indication information and the resource allocation type indication information; or The indication information of the allocation type of D2D discovery resource supported by the D2D UE in the UE capability information in the handover request message; or The communication type indication information, and the indication information of the allocation type of D2D discovery resource supported by the D2D UE in the UE capability information in the handover request message; or The resource allocation type indication information, and the indication information of the allocation type of D2D discovery resource supported by the D2D UE in the UE capability information in the handover request message; or The communication type indication information, the resource allocation type indication information, and the indication information of the allocation type of D2D discovery resource supported by the D2D UE in the UE capability information in the handover request message.

In an embodiment of the invention, the destination base station can determine for the D2D communication UE whether the D2D UE is a D2D transmitting UE in one of the following approaches:

if the D2D communication related information is communication type indication information and/or resource allocation type indication information, then the destination base station may determine that the D2D UE is a D2D transmitting UE.

If the D2D communication related information is transmission type indication information and resource allocation type indication information, or is communication type indication information, transmission type indication information, and resource allocation type indication information, then the destination base station may determine whether the D2D UE is a D2D transmitting UE according to the transmission type indication information.

In an embodiment of the invention, the destination base station can determine the resource allocation type of the D2D UE in the destination cell in one of the following approaches upon determining that the D2D UE is a D2D transmitting UE:

1) The D2D communication related information is communication type indication information.

The destination base station determines the resource allocation type of the D2D UE in the destination cell according to the communication type indication information, and the indication information of the allocation type of D2D communication resource supported by the D2D UE in the UE capability information in the handover request message.

2) The D2D communication related information is resource allocation type indication information.

The destination base station determines the resource allocation type of the D2D UE in the destination cell according to the resource allocation type indication information, and/or the indication information of the allocation type of D2D communication resource supported by the D2D UE in the UE capability information in the handover request message.

3) The D2D communication related information is communication type indication information and resource allocation type indication information.

The destination base station particularly determines the resource allocation type of the D2D UE in the destination cell according to the following information:

The communication type indication information; or

The resource allocation type indication information; or

The communication type indication information and the resource allocation type indication information; or The indication information of the allocation type of D2D communication resource supported by the D2D UE in the UE capability information in the handover request message; or The communication type indication information, and the indication information of the allocation type of D2D communication resource supported by the D2D UE in the UE capability information in the handover request message; or The resource allocation type indication information, and the indication information of the allocation type of D2D communication resource supported by the D2D UE in the UE capability information in the handover request message; or The communication type indication information, the resource allocation type indication information, and the indication information of the allocation type of D2D communication resource supported by the D2D UE in the UE capability information in the handover request message.

4) The D2D communication related information is transmission type indication information and resource allocation type indication information.

The destination base station particularly determines the resource allocation type of the D2D UE in the destination cell according to the following information:

The resource allocation type indication information; or

The indication info illation of the allocation type of D2D communication resource supported by the D2D UE in the UE capability information in the handover request message; or The resource allocation type indication information, and the indication information of the allocation type of D2D communication resource supported by the D2D UE in the UE capability information in the handover request message.

5) The D2D communication related information is communication type indication information, transmission type indication information, resource allocation type indication information, and resource configuration information.

The destination base station particularly determines the resource allocation type of the
D2D UE in the destination cell according to the following information:

The communication type indication information; or

The resource allocation type indication information; or

The communication type indication information and the resource allocation type indication information; or The indication information of the allocation type of D2D communication resource supported by the D2D UE in the UE capability information in the handover request message; or The communication type indication information, and the indication information of the allocation type of D2D communication resource supported by the D2D UE in the UE capability information in the handover request message; or The resource allocation type indication information, and the indication information of the allocation type of D2D communication resource supported by the D2D UE in the UE capability information in the handover request message; or The communication type indication information, the resource allocation type indication information, and the indication information of the allocation type of D2D communication resource supported by the D2D UE in the UE capability information in the handover request message.

Preferably if the destination base station determines only the resource allocation type which is Type1/Mode2 (a UE selection mode), then the method further includes:

The destination base station transmits a System Information Block (SIB) carrying a pool of transmission resources for a D2D discovery message and/or a pool of transmission resources for a D2D communication message to the D2D UE;

If the destination base station determines only the resource allocation type which is Type2/Mode1 (a network scheduling mode), then the method further includes:

The destination base station determines the D2D transmission resource according to the resource allocation type, and transmits the determined D2D transmission resource to the D2D UE through the source base station after the D2D UE is RRC connected with the destination cell;

Where Type1/Mode2 (a UE selection mode) is a resource allocation type in which the D2D UE selects one of resources in a pool of transmission resources to transmit a D2D discovery message or a D2D communication message, and Type2/Mode1 (a network scheduling mode) is a resource allocation type in which the D2D UE transmits a D2D discovery message or a D2D communication message over a network allocated resource.

Figure 5:
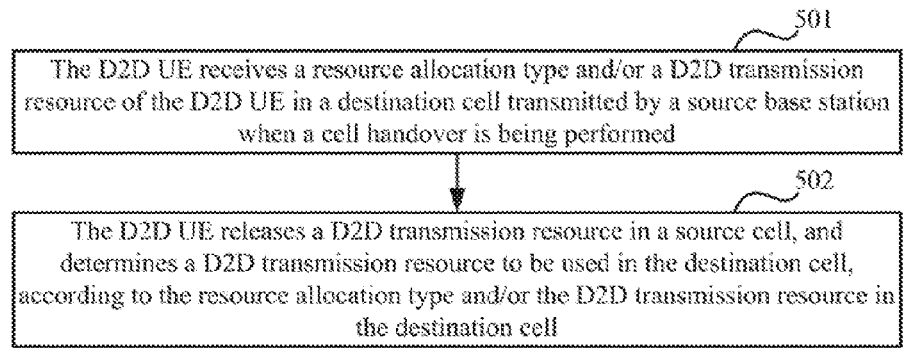
FIG. 5 is a flow chart of a method for determining by a D2D UE a D2D transmission resource according to an embodiment of the invention.

As illustrated in FIG. 5, a method for determining a D2D transmission resource according to an embodiment of the invention at the D2D UE side includes:

In the operation 501, the D2D UE receives a resource allocation type and/or a D2D transmission resource of the D2D UE in a destination cell transmitted by a source base station when a cell handover is being performed; and In the operation 502, the D2D UE releases a D2D transmission resource in a source cell, and determines a D2D transmission resource to be used in the destination cell, according to the resource allocation type and/or the D2D transmission resource in the destination cell.

If a resource allocation type in the source cell is Type1/Mode2 (a UE selection mode), then the D2D transmission resource may be a pool of resources, and if the resource allocation type in the source cell is Type2/Mode1 (a network scheduling mode), then the D2D transmission resource may be a particular resource allocated by the source base station.

Preferably the method further includes: the D2D UE receives RRC reconfiguration signaling, transmitted by the source base station, which does not include the resource allocation type and/or the D2D transmission resource of the D2D UE in the destination cell, and releases the D2D transmission resource in the source cell.

Particularly the D2D UE receives the resource allocation type and/or the D2D transmission resource of the D2D UE in the destination cell by receiving RRC reconfiguration signaling transmitted by the source base station.

If allocation type of D2D resource indication information is Type1, then the D2D UE may read an SIB of the destination cell, obtain a pool of transmission resources for a D2D discovery message from the SIB, and select one of the transmission resources for transmitting a D2D discovery message;

if the allocation type of D2D resource indication information is Type2 (Type2A/B, i.e., the network scheduling mode), then if the RRC reconfiguration signaling includes a particular D2D Discovery transmission resource, then the D2D UE may transmit using the resource allocation information; otherwise, the D2D UE may set up an RRC connection with the destination cell, receive D2D Discovery transmission resource indication information transmitted by the destination cell, and obtain the D2D transmission resource;

If the allocation type of D2D resource indication information is Mode1, then if the RRC reconfiguration signaling includes particular D2D Communication transmission resource allocation information, then the D2D UE may transmit using the resource allocation information; otherwise, the D2D UE may set up an RRC connection with the destination cell, receive D2D Communication transmission resource indication information transmitted by the destination cell, and obtain the D2D transmission resource;

If the allocation type of D2D resource indication information is Mode2, then the UE may read an SIB of the destination cell, obtain a pool of transmission resources for a D2D Communication message carried in the SIB, and select one of the transmission resources to transmit a D2D Communication message; and If the RRC reconfiguration signaling does not carry any resource allocation type indication information, but only carries a particular D2D transmission resource, then the D2D UE may transmit a D2D Discovery and/or Communication message over the D2D transmission resource.

Two preferred embodiments will be given below from the perspective of the source base station, the destination base station, and the D2D UE interoperating with each other.

First Embodiment

The D2D information carried in the handover request is resource allocation type indication information.

Figure 6:
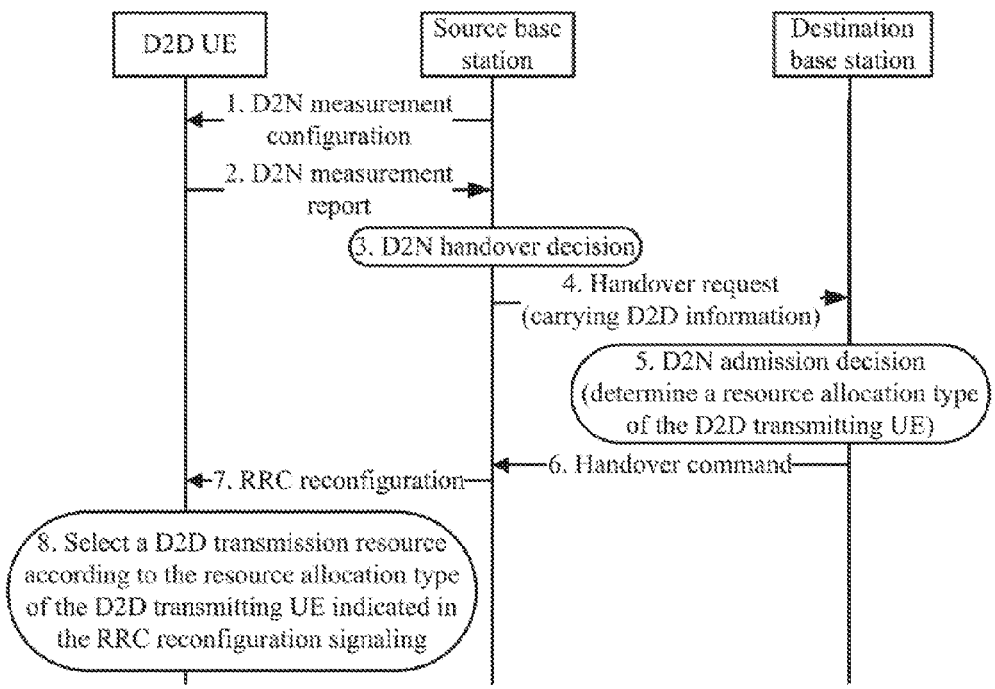
FIG. 6 is a flow chart of a method for indicating D2D related information and determining a D2D transmission resource according to a first embodiment of the invention.

The D2D UE determines a D2D transmission resource in D2N handover as illustrated in FIG. 6.

Respective operations in FIG. 6 are described as below:

In the first operation, the source base station configures the D2D UE in the D2N connected state to make a D2N measurement.

In the second operation, the D2D UE makes a D2N measurement report if a measurement event corresponding to a handover is satisfied.

In the third operation, the source base station makes a D2N handover decision on the UE, and determines the destination cell.

In the fourth operation, the source base station transmits the handover request message to the destination base station serving the destination cell, where the handover request message carries the D2D information of the UE to be handed over. The D2D information is particularly an allocation type of D2D resource used by the UE in the source cell. In the meanwhile, the handover request message can further carry supported D2D capability information of the UE, e.g., an allocation type of D2D discovery/communication resource supported by the UE.

In order to enable the D2D information to be carried in the D2N handover request message, the D2D information of the UE to be handed over needs to be added to the existing HANDOVER REQUEST message of the X2 interface, for example, the D2D information can be set in the enumerated type as follows:

D2D INFORMATION ENUMERATED (Type1, Type2A, Type2B, Mode1, Mode2, Null)

The value of the IE will be exemplified as follows:

If the UE is a D2D Discovery transmitting UE, and an allocation type of D2D Discovery resource used by the UE in the source cell is Type2B, then the value of D2D INFORMATION can be Type2B; and If the UE is a D2D Communication receiving UE or a D2D Discovery receiving UE, then the value of D2D INFORMATION thereof can be Null.

In the fifth operation, the destination base station makes a. D2N admission decision, and if the destination cell of the destination base station supports D2D, then the destination base station may also determine whether a transmission type of the UE to be handed over is a D2D transmitting UE according to the D2D information carried in the handover request, and if so, then the destination base station may further determine a resource allocation type to be used by the UE in the destination cell according to the communication type thereof.

Particularly the destination base station determines whether the UE to be handed over is a D2D transmitting UE, and the communication type thereof, according to the D2D information carried by the source base station in the handover request message, i.e., the value of the D2D INFORMATION IE. For example, if the value of the D2D INFORMATION IE is Mode1, then the destination base station may determine that the UE to be handed over is a D2D transmitting UE, and the communication type thereof is D2D Communication.

If the destination base station determines that the UE to be handed over is a D2D transmitting UE, and the communication type thereof, then the destination cell may determine the allocation type of D2D resource to be used by the UE in the destination cell based upon an implementation of the destination base station. For example, if the UE is a D2D Communication transmitting UE, then the destination base station may select Mode2 to be applied to the UE to thereby guarantee the continuity of a D2D Communication service during the handover. Optionally if the destination base station determines the resource allocation type as Type2A/B or Mode1, then the destination base station may further determine a particular D2D transmission resource.

In the sixth operation, the destination base station responds to the source base station with a handover command, where if the destination cell served by the destination base station supports D2D, then the handover command may carry the allocation type of D2D resource and/or the particular D2D transmission resource determined by the destination base station; otherwise, the handover command may not include the allocation type of D2D resource and/or indication information of the particular D2D transmission resource.

In the seventh operation, the source base station encapsulates the handover command transmitted by the destination base station into RRC reconfiguration signaling as a container, and transmits the RRC reconfiguration signaling to the D2D UE for which the D2N handover is to be performed, upon reception of the handover command.

In the eighth operation, if the UE to be handed over is a D2D transmitting UE, then the UE may release the D2D transmission resource or the pool of D2D transmission resources in the source cell. Furthermore if the RRC reconfiguration signaling includes the allocation type of D2D resource and/or the particular D2D transmission resource, then the UE may select a D2D transmission resource, particularly as described above, so a repeated description thereof will be omitted here.

Second Embodiment

The D2D information carried in the handover request is a communication type and a transmission type of the UE.

Figure 7:
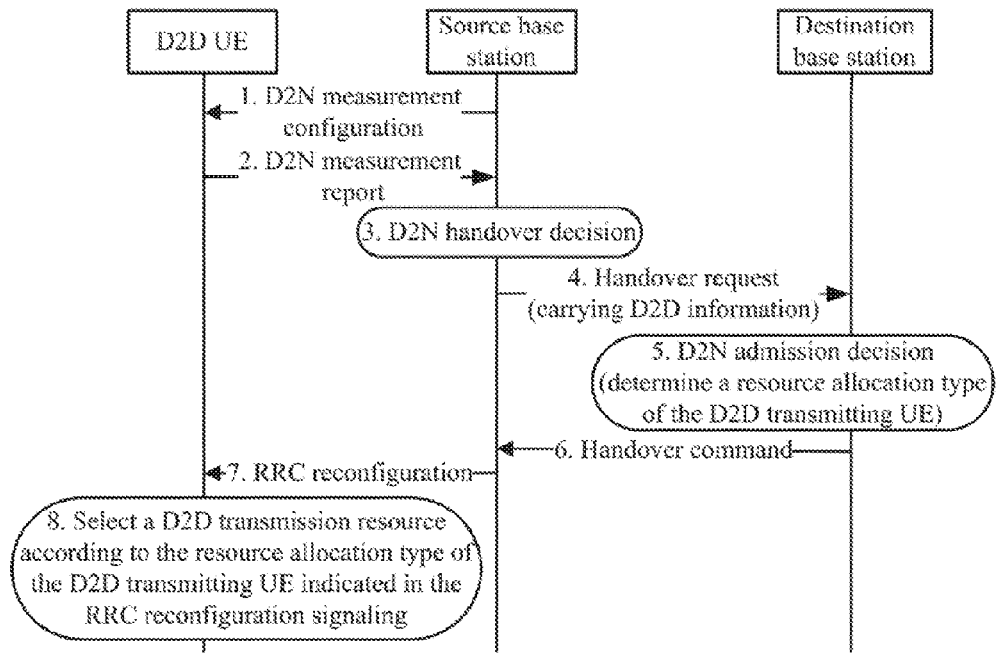
FIG. 7 is a flow chart of a method for indicating D2D related information and determining a D2D transmission resource according to a second embodiment of the invention.

The D2D UE determines a D2D transmission resource in D2N handover as illustrated in FIG. 7.

Respective operations in FIG. 7 are described as below:

In the first operation, the source base station configures the D2D UE in the D2N connected state to make a D2N measurement.

In the second operation, the D2D UE makes a D2N measurement report if a measurement event corresponding to a handover is satisfied.

In the third operation, the source base station makes a D2N handover decision on the UE, and determines the destination cell.

In the fourth operation, the source base station transmits the handover request message to the destination base station serving the destination cell, where the handover request message carries the D2D information of the UE to be handed over. The D2D information is particularly an allocation type of D2D resource used by the UE in the source cell. In the meanwhile, the handover request message can further carry supported D2D capability information of the UE, e.g., an allocation type of D2D discovery/communication resource supported by the UE.

In order to enable the D2D information to be carried in the D2N handover request message, the D2D information of the UE to be handed over needs to be added to the existing HANDOVER REQUEST message of the X2 interface, for example, the D2D information can be set in the enumerated type as follows:

D2D SERVICE TYPE ENUMERATED (Discovery, Communication)

D2D TRANSMISSION TYPE ENUMERATED (Tx, Rx)

The value of the IF, will be exemplified as follows:

If the UE is a D2D Discovery transmitting UE, then the values of D2D SERVICE TYPE and D2D TRANSMISSION TYPE may be Discovery and Tx respectively.

In the fifth operation, the destination base station makes a D2N admission decision, and if the destination cell of the destination base station supports D2D, then the destination base station may also determine whether a transmission type of the UE to be handed over is a D2D transmitting UE according to the D2D information carried in the handover request, and if so, then the destination base station may further determine a resource allocation type to be used by the UE in the destination cell according to the communication type thereof; otherwise, a handover command may not include any allocation type of D2D resource and/or particular D2D transmission resource indication information.

Particularly the destination base station determines whether the UE to be handed over is a D2D transmitting UE, and the communication type thereof, according to the D2D information carried by the source base station in the handover request message, i.e., the values of the D2D SERVICE TYPE IE and the D2D TRANSMISSION TYPE IE. For example, if the values of the D2D SERVICE TYPE IE and the D2D TRANSMISSION TYPE IE are Discovery and Tx respectively, then the destination base station may determine that the UE to be handed over is a D2D transmitting UE, and the communication type thereof is D2D Discovery.

If the destination base station determines that the UE to be handed over is a D2D transmitting UE, and the communication type thereof, then the destination cell may determine the allocation type of D2D resource to be used by the UE in the destination cell based upon an implementation of the destination base station. For example, if the UE is a D2D Communication transmitting UE, then the destination base station may select Mode2 to be applied to the UE to thereby guarantee the continuity of a D2D Communication service during the handover Optionally if the destination base station determines the resource allocation type as Type2A/B or Mode1, then the destination base station may further determine a particular D2D transmission resource.

In the sixth operation, the destination base station responds to the source base station with a handover command, where if the destination cell served by the destination base station supports D2D, then the handover command may carry the allocation type of D2D resource and/or the particular D2D transmission resource determined by the destination base station.

In the seventh operation, the source base station encapsulates the handover command transmitted by the destination base station into RRC reconfiguration signaling as a container, and transmits the RRC reconfiguration signaling to the D2D UE for which the D2N handover is to be performed, upon reception of the handover command.

In the eighth operation, if the UE to be handed over is a D2D transmitting UE, then the UE may release the D2D transmission resource or the pool of D2D transmission resources in the source cell. Furthermore if the RRC reconfiguration signaling includes the allocation type of D2D resource and/or the particular D2D transmission resource, then the UE may select a D2D transmission resource, particularly as described above, so a repeated description thereof will be omitted here.

Based upon the same inventive idea, embodiments of the invention further provide an apparatus for indicating D2D related information, and an apparatus for determining a D2D transmission resource, and since these apparatuses address the problem under a similar principle to the method for indicating D2D related information, and the method for determining a D2D transmission resource, reference can be made to the implementations of the methods for implementations of the apparatuses, so a repeated description will be omitted here.

Figure 8:
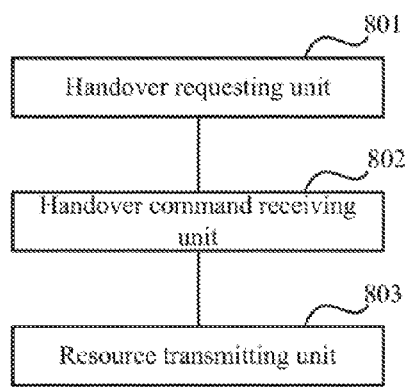
FIG. 8 is a schematic structural diagram of a source base station according to an embodiment of the invention.

As illustrated in FIG. 8, a source base station for indicating Device to Device (D2D) transmission resource includes:

A handover requesting unit 801 is configured to transmit a handover request message including Device to Device (D2D) related information of a D2D UE to a destination base station upon deciding to perform a cell handover of the D2D UE;

A handover command receiving unit 802 is configured to receive a handover command transmitted by the destination base station, where the handover command includes a resource allocation type and/or a D2D transmission resource of the D2D UE in a destination cell, determined by the destination base station according to the D2D related information; and A resource transmitting unit 803 is configured to transmit the determined resource allocation type and/or D2D transmission resource to the D2D UE.

Preferably the resource transmitting unit configured to transmit the determined resource allocation type and/or D2D transmission resource to the D2D UE is configured:

To carry the handover command in Radio Resource Control (RRC) reconfiguration signaling, and to transmit the RRC reconfiguration signaling to the D2D UE.

Preferably the handover requesting unit is configured to transmit the handover request, which further includes D2D UE capability, to the destination base station.

Preferably the D2D UE capability includes indication information of a resource allocation type of D2D discovery and/or communication supported by the D2D UE.

Preferably the D2D related information includes D2D discovery related information and/or D2D communication related information.

Preferably the D2D discovery related information of the D2D UE particularly includes:

Communication type indication information; or

Resource allocation type indication information; or

Communication type indication information and resource allocation type indication information; or Transmission type indication information and resource allocation type indication information; or Communication type indication information, transmission type indication information, resource allocation type indication information, and resource configuration information; or D2D discovery request information;

Where the communication type indication information indicates whether the D2D UE is performing D2D discovery; the resource allocation type indication information is Type1 (a UE selection mode), Type2a (a network scheduling mode), or Type2b (a network scheduling mode), or the resource allocation type indication information is Type1 (a UE selection mode) or Type2b (a network scheduling mode); and the transmission type indication information indicates whether the D2D UE is a D2D transmitting UE or a D2D receiving UE; and The D2D communication related information particularly includes:

Communication type indication information; or

Resource allocation type indication information; or

Communication type indication information and resource allocation type indication information; or Transmission type indication information and resource allocation type indication information; or Communication type indication information, transmission type indication information, resource allocation type indication information, and resource configuration information; or D2D communication request information;

Where the communication type indication information indicates whether the D2D UE is performing D2D communication; the resource allocation type indication information is Mode1 (a network scheduling mode) or Mode2 (a UE selection mode); and the transmission type indication information indicates whether the D2D UE is a D2D transmitting UE or a D2D receiving UE.

Preferably if the D2D communication related information of the D2D UE is the communication type indication information, or the resource allocation type indication information, or the communication type indication information and the resource allocation type indication information, then the handover requesting unit configured to transmit the handover request message to the destination base station will be configured:

To carry the D2D communication related information in the handover request message transmitted to the destination base station only if the D2D UE is a D2D transmitting UE, and the communication type thereof is D2D communication; or If the D2D discovery related information of the D2D UE is the communication type indication information, or the resource allocation type indication information, or the communication type indication information and the resource allocation type indication information, then the handover requesting unit configured to transmit the handover request message to the destination base station will be configured:

To carry the D2D discovery related information in the handover request message transmitted to the destination base station only if the D2D UE is a D2D transmitting UE, and the communication type thereof is D2D discovery.

Figure 9:
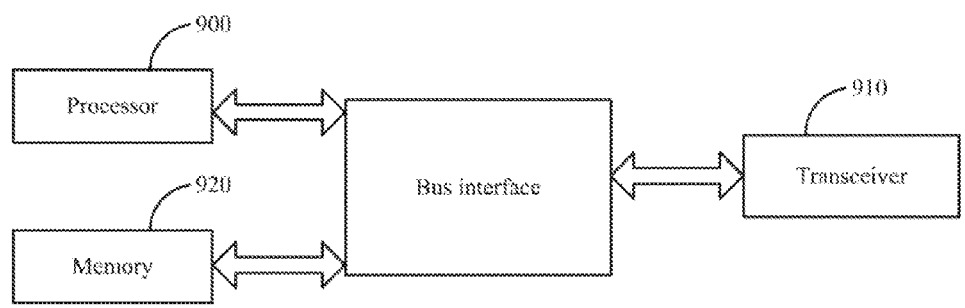
FIG. 9 is a hardware structural diagram corresponding to a particular implementation of a source base station according to an embodiment of the invention.

An embodiment of the invention further provides a source base station as illustrated in FIG. 9 including a processor 900, a transceiver 910, and a memory 920, where:

The processor 900 is configured to read program in the memory 920, and to perform the process of: transmitting a handover request message including Device to Device (D2D) related information of a D2D UE to a destination base station upon deciding to perform a cell handover of the D2D UE; receiving a handover command transmitted by the destination base station, where the handover command includes a resource allocation type and/or a D2D transmission resource of the D2D UE in a destination cell, determined by the destination base station according to the D2D related information; and transmitting the determined resource allocation type and/or D2D transmission resource to the D2D UE; and The transceiver 910 is configured to be controlled by the processor 900 to receive and transmit data.

Here in FIG. 9, the bus architecture can include any number of interconnected buses and bridges and particularly link together various circuits including one or more processors represented by the processor 900 and one or more memories represented by the memory 920. The bus architecture can further link together various other circuits, e.g., peripheral devices, a voltage stabilizer, a power management circuit, etc., and all these circuits are well known in the art, so a further description thereof will be omitted in this context. The bus interface serves as an interface. The transceiver 910 can include a plurality of elements including a transmitter and a receiver serving as elements configured to communicate with various other devices over a transmission medium. The processor 900 is responsible for managing the bus architecture and performing other normal processes, and the memory 920 can store data for use by the processor 900 in operation.

The processor 900 is responsible for managing the bus architecture and performing other normal processes, and the memory 920 can store data for use by the processor 900 in operation.

Figure 10:
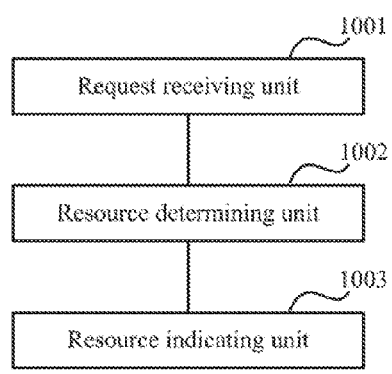
FIG. 10 is a schematic structural diagram of a destination base station according to an embodiment of the invention.

An embodiment of the invention further provides a destination base station for indicating a Device To Device (D2D) transmission resource as illustrated in FIG. 10 including:

A request receiving unit 1001 is configured to receive a handover request message, including D2D related information of a D2D UE, transmitted by a source base station;

A resource determining unit 1002 is configured to determine a resource allocation type of the D2D UE in a destination cell according to the D2D related information, and/or to determine a D2D transmission resource of the D2D UE according to the determined resource allocation type, upon determining that the D2D UE is a D2D transmitting UE; and A resource indicating unit 1003 is configured to transmit a handover command carrying the determined resource allocation type and/or D2D transmission resource to the source base station.

Preferably if the request receiving unit configured to receive the handover request message transmitted by the source base station determines that the destination base station does not support a D2D function, then the request receiving unit may be configured to transmit the handover command which does not carry the resource allocation type and/or the D2D transmission resource to the source base station.

Preferably the handover request message further includes D2D UE capability,

Preferably the D2D UE capability includes indication information of a resource allocation type of D2D discovery and/or communication supported by the D2D UE.

Preferably the D2D related information includes D2D discovery related information and/or D2D communication related information.

Preferably the D2D discovery related information of the D2D UE particularly includes:

Communication type indication information; or

Resource allocation type indication information; or

Communication type indication information and resource allocation type indication information; or Transmission type indication information and resource allocation type indication information; or Communication type indication information, transmission type indication information, resource allocation type indication information, and resource configuration information; or D2D discovery request information;

Where the communication type indication information indicates whether the D2D UE is performing D2D discovery; the resource allocation type indication information is Type1 (a UE selection mode), Type2a (a network scheduling mode), or Type2b (a network scheduling mode), or the resource allocation type indication information is Type1 (a UE selection mode) or Type2b (a network scheduling mode); and the transmission type indication information indicates whether the D2D UE is a D2D transmitting UE or a D2D receiving UE.

The D2D communication related information particularly includes:

Communication type indication information; or

Resource allocation type indication information; or

Communication type indication information and resource allocation type indication information; or Transmission type indication information and resource allocation type indication information; or Communication type indication information, transmission type indication information, resource allocation type indication information, and resource configuration information; or D2D communication request information;

Where the communication type indication information indicates whether the D2D UE is performing D2D communication; the resource allocation type indication information is Mode1 (a network scheduling mode) or Mode2 (a UE selection mode); and the transmission type indication information indicates whether the D2D UE is a D2D transmitting UE or a D2D receiving UE.

Preferably the resource determining unit configured to determine that the D2D UE is a D2D transmitting UE is configured:

If the D2D discovery related information is the communication type indication information and/or the resource allocation type indication information, to determine that the D2D UE is a D2D transmitting UE;

if the D2D discovery related information is the transmission type indication information and the resource allocation type indication information, or is the communication type indication information, the transmission type indication information, and the resource allocation type indication information, to determine whether the D2D UE is a D2D transmitting UE according to the transmission type indication information;

If the D2D communication related information is the communication type indication information and/or the resource allocation type indication information, to determine that the D2D UE is a D2D transmitting UE; and If the D2D communication related information is the transmission type indication information and the resource allocation type indication information, or is the communication type indication information, the transmission type indication information, and the resource allocation type indication information, to determine whether the D2D UE is a D2D transmitting UE according to the transmission type indication information.

Preferably the resource determining unit configured to determine the resource allocation type of the D2D UE in the destination cell according to the D2D related information is configured:

If the D2D discovery related information is the communication type indication information, to determine the resource allocation type of the D2D UE in the destination cell according to the communication type indication information, and the indication information of the allocation type of D2D discovery resource supported by the D2D UE in the UE capability information in the handover request message;

If the D2D discovery related information is the resource allocation type indication information, to determine the resource allocation type of the D2D UE in the destination cell according to the resource allocation type indication information, and/or the indication information of the allocation type of D2D discovery resource supported by the D2D UE in the UE capability information in the handover request message;

If the D2D discovery related information is the communication type indication information and the resource allocation type indication information, to determine the resource allocation type of the D2D UE in the destination cell according to the communication type indication information, and/or the resource allocation type indication information, and/or the indication information of the allocation type of D2D discovery resource supported by the D2D UE in the UE capability information in the handover request message;

If the D2D discovery related information is the transmission type indication information and the resource allocation type indication information, to determine the resource allocation type of the D2D UE in the destination cell according to the resource allocation type indication information, and/or the indication information of the allocation type of D2D discovery resource supported by the D2D UE in the UE capability information in the handover request message; and If the D2D discovery related information is the communication type indication information, the transmission type indication information, and the resource allocation type indication information, to determine the resource allocation type of the D2D UE in the destination cell according to the communication type indication, and/or the resource allocation type indication information, and/or the indication information of the allocation type of D2D discovery resource supported by the D2D UE in the LE capability information in the handover request message.

Preferably the resource determining unit configured to determine the resource allocation type of the D2D UE in the destination cell according to the D2D related information is configured:

If the D2D communication related information is the communication type indication information, to determine the resource allocation type of the D2D UE in the destination cell according to the communication type indication information, and the indication information of the allocation type of D2D communication resource supported by the D2D UE in the UE capability information in the handover request message;

If the D2D communication related information is the resource allocation type indication information, to determine the resource allocation type of the D2D UE in the destination cell according to the resource allocation type indication information, and/or the indication information of the allocation type of D2D communication resource supported by the D2D UE in the UE capability information in the handover request message;

if the D2D communication related information is the communication type indication information and the resource allocation type indication information, to determine the resource allocation type of the D2D UE in the destination cell according to the communication type indication information, and/or the resource allocation type indication information, and/or the indication information of the allocation type of D2D communication resource supported by the D2D UE in the UE capability information in the handover request message;

If the D2D communication related information is the transmission type indication information and the resource allocation type indication information, to determine the resource allocation type of the D2D UE in the destination cell according to the resource allocation type indication information, and/or the indication information of the allocation type of D2D communication resource supported by the D2D UE in the UE capability information in the handover request message; and If the D2D communication related information is the communication type indication information, the transmission type indication information, and the resource allocation type indication information, to determine the resource allocation type of the D2D UE in the destination cell according to the communication type indication information, and/or the resource allocation type indication information, and/or the indication information of the allocation type of D2D communication resource supported by the D2D UE in the UE capability information in the handover request message.

Preferably the resource determining unit configured to determine only the resource allocation type which is Type1/Mode2 (a UE selection mode) is further configured:

To transmit a System Information Block (SIB) carrying a pool of transmission resources for a D2D discovery message and/or a pool of transmission resources for a D2D communication message to the D2D UE; and The resource determining unit configured to determine only the resource allocation type which is Type2/Mode1 (a network scheduling mode) is further configured:

To determine the D2D transmission resource according to the resource allocation type, and to transmit the determined D2D transmission resource to the D2D UE through the source base station after the D2D UE is RRC connected with the destination cell;

Where Type1/Mode2 (a UE selection mode) is a resource allocation type in which the D2D UE selects one of resources in a pool of transmission resources to transmit a D2D discovery message or a D2D communication message, and Type2/Mode1 (a network scheduling mode) is a resource allocation type in which the D2D UE transmits a D2D discovery message or a D2D communication message over a network allocated resource.

Figure 11:
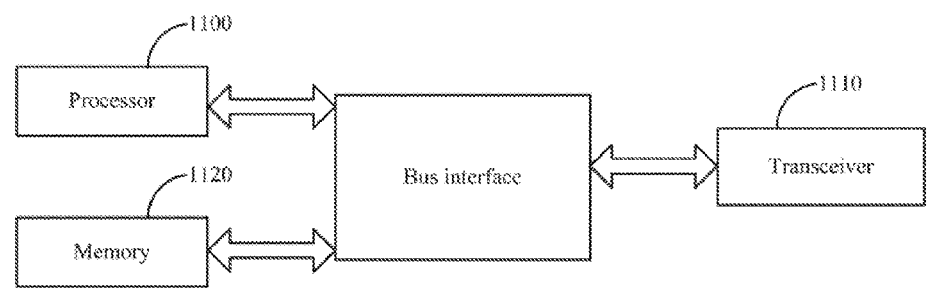
FIG. 11 is a hardware structural diagram corresponding to a particular implementation of a destination base station according to an embodiment of the invention.

An embodiment of the invention further provides a destination base station as illustrated in FIG. 11 including a processor 1100, a transceiver 1110, and a memory 1120, where:

The processor 1100 is configured to read program in the memory 1120, and to perform the process of receiving a handover request message, including D2D related information of a D2D UE, transmitted by a source base station through the transceiver 1110; to determine a resource allocation type of the D2D UE in a destination cell according to the D2D related information, and/or to determine a D2D transmission resource of the D2D UE according to the determined resource allocation type, upon determining that the D2D UE is a D2D transmitting UE; and to transmit a handover command carrying the determined resource allocation type and/or D2D transmission resource to the source base station; and The transceiver 1110 is configured to be controlled by the processor 1100 to receive and transmit data.

Here in FIG. 11, the bus architecture can include any number of interconnected buses and bridges and particularly link together various circuits including one or more processors represented by the processor 1100 and one or more memories represented by the memory 1120. The bus architecture can further link together various other circuits, e.g., peripheral devices, a voltage stabilizer, a power management circuit, etc., and all these circuits are well known in the art, so a further description thereof will be omitted in this context. The bus interface serves as an interface. The transceiver 1110 can include a plurality of elements including a transmitter and a receiver serving as elements configured to communicate with various other devices over a transmission medium. The processor 1100 is responsible for managing the bus architecture and performing other normal processes, and the memory 1120 can store data for use by the processor 1100 in operation.

The processor 1100 is responsible for managing the bus architecture and performing other normal processes, and the memory 1120 can store data for use by the processor 1100 in operation.

Figure 12:
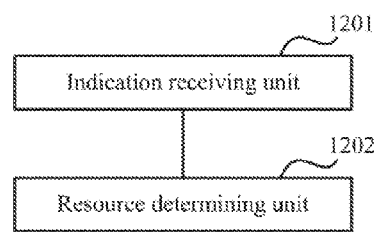
FIG. 12 is a schematic structural diagram of a D2D UE according to an embodiment of the invention.

As illustrated in FIG. 12, an embodiment of the invention provides a Device to Device (D2D) User Equipment (UE) including:

An indication receiving unit 1201 is configured to receive a resource allocation type and/or a D2D transmission resource of the D2D UE in a destination cell transmitted by a source base station when a cell handover is being performed; and A resource determining unit 1202 is configured to release a D2D transmission resource in a source cell, and to determine a D2D transmission resource to be used in the destination cell, according to the resource allocation type and/or the D2D transmission resource in the destination cell.

Preferably the resource determining unit is further configured to release the D2D transmission resource in the source cell upon reception of RRC reconfiguration signaling, transmitted by the source base station, which does not include the resource allocation type and/or the D2D transmission resource of the D2D UE in the destination cell, if the destination cell does not support D2D.

Preferably the resource determining unit configured to determine the D2D transmission resource to be used in the destination cell, upon reception of only the resource allocation type in the destination cell is configured:

If the received resource allocation type is Type1/Mode2 (a UE selection mode), to read a System Information Block (SIB) of the destination cell, to obtain a pool of transmission resources for a D2D discovery message, and/or a pool of transmission resources for a D2D communication message from the SIB, and to select one of the transmission resources for transmitting a D2D discovery message and/or a D2D communication message; and If the received resource allocation type is Type2/Mode1 (a network scheduling mode), to set up an RRC connection with the destination cell, and to receive the D2D transmission resource in the destination cell transmitted by the destination base station;

Where Type1/Mode2 (a UE selection mode) is a resource allocation type in which the D2D UE selects one of resources in a pool of transmission resources to transmit a D2D discovery message or a D2D communication message, and Type2/Mode1 (a network scheduling mode) is a resource allocation type in which the D2D UE transmits a D2D discovery message or a D2D communication message over a network allocated resource.

Preferably the resource determining unit configured to determine the D2D transmission resource to be used in the destination cell, upon reception of the resource allocation type and the D2D transmission resource in the destination cell, or only the D2D transmission resource is configured:

To determine the received D2D transmission resource as the transmission resource over which a D2D discovery message and/or a D2D communication message is transmitted in the destination cell.

Figure 13:
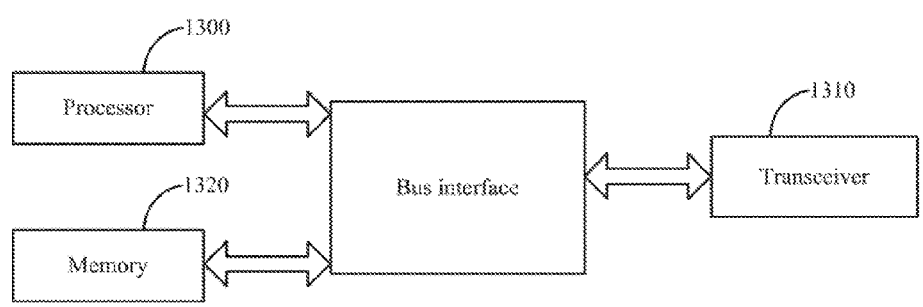
FIG. 13 is a hardware structural diagram corresponding to a particular implementation of a D2D UE according to an embodiment of the invention.

An embodiment of the invention further provides a Device to Device (D2D) User Equipment (UE) as illustrated in FIG. 13 including a processor 1300, a transceiver 1310, and a memory 1320, where:

The processor 1300 is configured to read program in the memory 1320, and to perform the process of receiving a resource allocation type and/or a D2D transmission resource of the D2D UE in a destination cell transmitted by a source base station when a cell handover is being performed; and releasing a D2D transmission resource in a source cell, and determining a D2D transmission resource to be used in the destination cell, according to the resource allocation type and/or the D2D transmission resource in the destination cell; and The transceiver 1310 is configured to be controlled by the processor 1300 to receive and transmit data.

Here in FIG. 13, the bus architecture can include any number of interconnected buses and bridges and particularly link together various circuits including one or more processors represented by the processor 1300 and one or more memories represented by the memory 1320. The bus architecture can further link together various other circuits, e.g., peripheral devices, a voltage stabilizer, a power management circuit, etc., and all these circuits are well known in the art, so a further description thereof will be omitted in this context. The bus interface serves as an interface. The transceiver 1310 can include a plurality of elements including a transmitter and a receiver serving as elements configured to communicate with various other devices over a transmission medium. The processor 1300 is responsible for managing the bus architecture and performing other normal processes, and the memory 1320 can store data for use by the processor 1300 in operation.

The processor 1300 is responsible for managing the bus architecture and performing other normal processes, and the memory 1320 can store data for use by the processor 1300 in operation.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for indicating, by a source base station, Device to Device (D2D) related information, the method comprising:
    transmitting a handover request message comprising Device to Device (D2D) related information of a D2D UE to a destination base station upon deciding to perform a cell handover of the D2D UE;
    receiving a handover command transmitted by the destination base station, wherein the handover command comprises a resource allocation type and/or a D2D transmission resource of the D2D UE in a destination cell, determined by the destination base station according to the D2D related information; and
    transmitting the determined resource allocation type and/or D2D transmission resource to the D2D UE;
    wherein the D2D related information comprises D2D discovery related information and/or D2D communication related information;
    wherein the D2D discovery related information of the D2D UE comprises: communication type indication information; or
    resource allocation type indication information; or
    communication type indication information and resource allocation e indication information; or
    transmission type indication information and resource allocation type indication information; or
    communication type indication information, transmission type indication information, resource allocation type indication information, and resource configuration information; or
    D2D discovery request information;
    wherein the communication type indication information indicates whether the D2D UE is performing D2D discovery; the resource allocation type indication information is a UE selection mode or a network scheduling mode; and the transmission type indication information indicates whether the D2D UE is a D2D transmitting UE or a D2D receiving UE; and the D2D communication related information comprises:
resource allocation type indication information; or
communication type indication information and resource allocation type indication information; or
transmission type indication information and resource allocation type indication information; or
communication type indication information, transmission type indication information, resource allocation type indication information, and resource configuration information; or
wherein the communication type indication information indicates whether the D2D UE is performing D2D communication; the resource allocation type indication information is a UE selection mode or a network scheduling mode; and the transmission type indication information indicates whether the D2D UE is a D2D transmitting UE or a D2D receiving UE.

2. The method according to claim 1, wherein transmitting the determined resource allocation type and/or D2D transmission resource to the D2D UE comprises:
carrying the handover command in Radio Resource Control (RRC) reconfiguration signaling, and transmitting the RRC reconfiguration signaling to the D2D UE.

3. The method according to claim 1, wherein the handover request transmitted by the source base stations to the destination base station further comprises D2D UE capability.

4. The method according to claim 3, wherein the D2D UE capability comprises indication information of a resource allocation type of D2D discovery and/or communication supported by the D2D UE.

5. The method according to claim 1, wherein if the D2D communication related information of the D2D UE is the communication type indication information, or the resource allocation type indication information, or the communication type indication information and the resource allocation type indication information, then transmitting the handover request message to the destination base station comprises:
transmitting the handover request message carrying the D2D communication related information to the destination base station only if the D2D UE is a D2D transmitting UE, and the communication type thereof is D2D communication; or
if the D2D discovery related information of the D2D UE is the communication type indication information, or the resource allocation type indication information, or the communication type indication information and the resource allocation type indication information, then transmitting the handover request message to the destination base station comprises:
transmitting the handover request message carrying the D2D discovery related information to the destination base station only if the D2D UE is a D2D transmitting UE, and the communication type thereof is D2D discovery.

6. A method for indicating, by a destination base station, a Device To Device (D2D) transmission resource, the method comprising:
receiving a handover request message, comprising D2D related information of a D2D UE, transmitted by a source base station;
determining a resource allocation type of the D2D UE in a destination cell according to the D2D related information, and/or determining a D2D transmission resource of the D2D UE according to the determined resource allocation type, upon determining that the D2D UE is a D2D transmitting UE; and
transmitting a handover command carrying the determined resource allocation type and/or D2D transmission resource to the source base station;
wherein if only the resource allocation type which is a UE selection mode is determined, then the method further comprises:
transmitting a System Information Block (SIB) carrying a pool of transmission resources for a D2D discovery message and/or a pool of transmission resources for a D2D communication message to the D2D UE; and
if only the resource allocation type which is a network scheduling mode is determined, then the method further comprises:
determining the D2D transmission resource according to the resource allocation type, and transmitting the determined D2D transmission resource to the D2D UE through the source base station after the D2D UE is RRC connected with the destination cell;
wherein the UE selection mode is a resource allocation type in which the D2D UE selects one of resources in a pool of transmission resources to transmit a MD discovery message or a D2D communication message, and the network scheduling mode is a resource allocation type in which the D2D UE transmits a D2D discovery message or a D2D communication message over a network allocated resource.

7. The method according to claim 6, wherein the method further comprises:
if the destination base station receiving the handover request message transmitted by the source base station determines that the destination base station does not support a D2D function, then transmitting the handover command which does not carry the resource allocation type and/or the D2D transmission resource to the source base station.

8. The method according to claim 6, wherein the handover request message further comprises D2D UE capability;
wherein the D2D UE capability comprises indication information of a resource allocation type of D2D discovery and/or communication supported by the D2D UE.

9. The method according to claim 7, wherein the D2D related information comprises D2D discovery related information and/or D2D communication related information.

10. The method according to claim 9, wherein the D2D discovery related information of the D2D UE comprises:
communication type indication information; or
resource allocation type indication information; or
communication type indication information and resource allocation type indication information; or
transmission type indication information and resource allocation type indication information; or
communication type indication information, transmission type indication information, resource allocation type indication information, and resource configuration information; or
D2D discovery request information;
wherein the communication type indication information indicates whether the D2D UE is performing D2D discovery; the resource allocation type indication information is a UE selection mode or a network scheduling mode; and the transmission type indication information indicates whether the D2D UE is a D2D transmitting UE or a D2D receiving UE; and
the D2D communication related information comprises:
communication type indication information; or
resource allocation type indication information; or communication type indication information and resource allocation type indication information; or transmission type indication information and resource allocation type indication information; or communication type indication information, transmission type indication information, resource allocation type indication information, and resource configuration information; or D2D communication request information;

wherein the communication type indication information indicates whether the D2D UE is performing D2D communication; the resource allocation type indication information is a UE selection mode or a network scheduling mode; and the transmission type indication information indicates whether the D2D UE is a D2D transmitting UE or a D2D receiving UE.

11. The method according to claim 10, wherein determining that the D2D UE is a D2D transmitting UE comprises:

if the D2D discovery related information is the communication type indication information and/or the resource allocation type indication information, then determining that the D2D UE is a D2D transmitting UE; or if the D2D discovery related information is the transmission type indication information and the resource allocation type indication information, or is the communication type indication information, the transmission type indication information, and the resource allocation type indication information, then determining whether the D2D UE is a D2D transmitting UE according to the transmission type indication information; or if the D2D communication related information is the communication type indication information and/or the resource allocation type indication information, then determining that the D2D UE is a D2D transmitting UE; or if the D2D communication related information is the transmission type indication information and the resource allocation type indication information, or is the communication type indication information, the transmission type indication information, and the resource allocation type indication information, then determining whether the D2D UE is a D2D transmitting UE according to the transmission type indication information.

12. The method according to claim 10, wherein determining the resource allocation type of the D2D UE in the destination cell according to the D2D related information comprises:

if the D2D discovery related information is the communication type indication information, then determining the resource allocation type of the D2D UE in the destination cell according to the communication type indication information, and indication information of an allocation type of D2D discovery resource supported by the D2D UE in UE capability information in the handover request message; or if the D2D discovery related information is the resource allocation type indication information, then determining the resource allocation type of the D2D UE in the destination cell according to the resource allocation type indication information, and/or the indication information of the allocation type of D2D discovery resource supported by the D2D UE in the UE capability information in the handover request message; or if the D2D discovery related information is the communication type indication information and the resource allocation type indication information, then determining the resource allocation type of the D2D UE in the destination cell according to the communication type indication information, and/or the resource allocation type indication information, and/or the indication information of the allocation type of D2D discovery resource supported by the D2D UE in the UE capability information in the handover request message; or if the D2D discovery related information is the transmission type indication information and the resource allocation type indication information, then determining the resource allocation type of the D2D UE in the destination cell according to the resource allocation type indication information, and/or the indication information of the allocation type of D2D discovery resource supported by the D2D UE in the UE capability information in the handover request message; or if the D2D discovery related information is the communication type indication information, the transmission type indication information, and the resource allocation type indication information, then determining the resource allocation type of the D2D UE in the destination cell according to the communication type indication, and/or the resource allocation type indication information, and/or the indication information of the allocation type of D2D discovery resource supported by the D2D UE in the UE capability information in the handover request message.

13. The method according to claim 10, wherein determining the resource allocation type of the D2D UE in the destination cell according to the D2D related information comprises:

if the D2D communication related information is the communication type indication information, then determining the resource allocation type of the D2D UE in the destination cell according to the communication type indication information, and indication information of an allocation type of D2D communication resource supported by the D2D UE in UE capability information in the handover request message; or if the D2D communication related information is the resource allocation type indication information, then determining the resource allocation type of the D2D UE in the destination cell according to the resource allocation type indication information, and/or the indication information of the allocation type of D2D communication resource supported by the D2D UE in the UE capability information in the handover request message; or if the D2D communication related information is the communication type indication information and the resource allocation type indication information, then determining the resource allocation type of the D2D UE in the destination cell according to the communication type indication information, and/or the resource allocation type indication information, and/or the indication information of the allocation type of D2D communication resource supported by the D2D UE in the UE capability information in the handover request message; or if the D2D communication related information is the transmission type indication information and the resource allocation type indication information, then determining the resource allocation type of the D2D UE in the destination cell according to the resource allocation type indication information, and/or the indication information of the allocation type of D2D communication resource supported by the D2D UE in the UE capability information in the handover request message; or if the D2D communication related information is the communication type indication information, the transmission type indication information, and the resource allocation type indication information, then determining the resource allocation type of the D2D UE in the destination cell according to the communication type indication information, and/or the resource allocation type indication information, and/or the indication information of the allocation type of D2D communication resource supported by the D2D UE in the UE capability information in the handover request message.

14. A method for determining, by a Device to Device (D2D) User Equipment (UE), a D2D transmission resource, the method comprising:

receiving a resource allocation type and/or a D2D transmission resource of the D2D UE in a destination cell transmitted by a source base station when a cell handover is being performed; and releasing a D2D transmission resource in a source cell, and determining a D2D transmission resource to be used in the destination cell, according to the resource allocation type and/or the D2D transmission resource in the destination cell;

wherein determining the D2D transmission resource to be used in the destination cell, upon reception of only the resource allocation type in the destination cell comprises:

if the received resource allocation type is a UE selection mode, then reading a System Information Block (SIB) of the destination cell, obtaining a pool of transmission resources for a D2D discovery message, and/or a pool of transmission resources for a D2D communication message from the SIB, and selecting one of the transmission resources for transmitting a D2D discovery message and/or a D2D communication message; or if the received resource allocation type is a network scheduling mode, then setting up an RRC connection with the destination cell, and receiving the D2D transmission resource in the destination cell transmitted by the destination base station;

wherein the UE selection mode is a resource allocation type in which the D2D UE selects one of resources in a pool of transmission resources to transmit a D2D discovery message or a D2D communication message, and the network scheduling mode is a resource allocation type in which the D2D UE transmits a D2D discovery message or a D2D communication message over a network allocated resource.

15. The method according to claim 14, wherein the method further comprises:

receiving RRC reconfiguration signaling, transmitted by the source base station, which does not comprise the resource allocation type and/or the D2D transmission resource of the D2D UE in the destination cell, if the destination cell does not support D2D, and releasing the D2D transmission resource in the source cell.

16. The method according to claim 14, wherein determining the D2D transmission resource to be used in the destination cell, upon reception of the resource allocation type and the D2D transmission resource in the destination cell, or only the D2D transmission resource comprises:

determining the received D2D transmission resource as the transmission resource over which a D2D discovery message and/or a D2D communication message is transmitted in the destination cell.

17. A source base station for indicating Device to Device (D2D) related information, the source base station comprising:

a transceiver;
a processor; and
a memory storing at least one instruction, wherein the processor is configured to execute the at least one instruction to:

control the transceiver to transmit a handover request message comprising Device to Device (D2D) related information of a D2D UE to a destination base station upon deciding to perform a cell handover of the D2D UE;

control the transceiver to receive a handover command transmitted by the destination base station, wherein the handover command comprises a resource allocation type and/or a D2D transmission resource of the D2D UE in a destination cell, determined by the destination base station according to the D2D related information; and control the transceiver to transmit the determined resource allocation type and/or D2D transmission resource to the D2D UE;

wherein the D2D related information comprises D2D discovery related information and/or D2D communication related information;

wherein the D2D discovery related information of the D2D UE comprises:

communication type indication information; or resource allocation type indication information; or communication type indication information and resource allocation type indication information; or transmission type indication information and resource allocation type indication information; or communication type indication information transmission type indication information, resource allocation type indication information, and resource configuration information; or D2D discovery request information;

wherein the communication type indication information indicates whether the D2D UE is performing D2D discovery; the resource allocation type indication information is a UE selection mode or a network scheduling mode; and the transmission type indication information indicates whether the D2D UE is a D2D transmitting UE or a D2D receiving UE; and the D2D communication related information comprises:
resource allocation type indication information; or communication type indication information and resource allocation type indication information; or transmission type indication information and resource allocation type indication information; or communication type indication information, transmission type indication information, resource allocation type indication information, and resource configuration information;

wherein the communication type indication information indicates whether the D2D UE is performing D2D communication; the resource allocation type indication information is a UE selection mode or a network scheduling mode; and the transmission type indication information indicates whether the D2D UE is a D2D transmitting UE or a D2D receiving UE.

18. A destination base station for indicating a Device To Device (D2D) transmission resource, the destination base station comprising:

a transceiver;
a processor; and
a memory storing at least one instruction, wherein the processor is configured to execute the at least one instruction to:
control the transceiver to receive a handover request message, comprising D2D related information of a D2D UE, transmitted by a source base station;
determine a resource allocation type of the D2D UE in a destination cell according to the D2D related information, and/or determine a D2D transmission resource of the D2D UE according to the determined resource allocation type, upon determining that the D2D UE is a D2D transmitting UE; and
control the transceiver to transmit a handover command carrying the determined resource allocation type and/or D2D transmission resource to the source base station;
wherein if only the resource allocation type which is a UE selection mode is determined, then the processor is further configured to execute the at least one instruction to:
control the transceiver to transmit a System Information Block (SIB) carrying a pool of transmission resources for a D2D discovery message and/or a pool of transmission resources for a D2D communication message to the D2D UE; and
if only the resource allocation type which is a network scheduling mode is determined, then the processor is further configured to execute the at least one instruction to:
determine the D2D transmission resource according to the resource allocation type, and control the transceiver to transmit the determined D2D transmission resource to the D2D UE through the source base station after the D2D UE is RRC connected with the destination cell;
wherein the UE selection mode is a resource allocation type in which the D2D UE selects one of resources in a pool of transmission resources to transmit a D2D discovery message or a D2D communication message, and the network scheduling mode is a resource allocation type in which the D2D UE transmits a D2D discovery message or a D2D communication message over a network allocated resource.

19. The destination base station according to claim 18, wherein the processor is configured to execute the at least one instruction to:

after having received the handover request message transmitted by the source base station, if it is determined that the destination base station does not support a D2D function, then control the transceiver to transmit the handover command which does not carry the resource allocation type and/or the D2D transmission resource to the source base station.

20. A Device to Device (D2D) user equipment, the user equipment comprising:
a transceiver;
a processor; and
a memory storing at least one instruction, wherein the processor is configured to execute the at least one instruction to:
control the transceiver to receive a resource allocation type and/or a D2D transmission resource of the D2D UE in a destination cell transmitted by a source base station when a cell handover is being performed; and
release a D2D transmission resource in a source cell, and determine a D2D transmission resource to be used in the destination cell, according to the resource allocation type and/or the D2D transmission resource in the destination cell;
wherein the processor is specifically configured to execute the at least one instruction to:
if the received resource allocation type is a UE selection mode, then read a System Information Block (SIB) of the destination cell, obtain a pool of transmission resources for a D2D discovery message, and/or a pool of transmission resources for a D2D communication message from the SIB, and select one of the transmission resources for transmitting a D2D discovery message and/or a D2D communication message; or
if the received resource allocation type is a network scheduling mode, then set up an RRC connection with the destination cell, and control the transceiver to receive the D2D transmission resource in the destination cell transmitted by the destination base station;
wherein the UE selection mode is a resource allocation type in which the D2D UE selects one of resources in a pool of transmission resources to transmit a D2D discovery message or a D2D communication message, and the network scheduling mode is a resource allocation type in which the D2D UE transmits a D2D discovery message or a D2D communication message over a network allocated resource.

* * * * *